United States Patent
Wu

(10) Patent No.: US 10,440,615 B2
(45) Date of Patent: Oct. 8, 2019

(54) METHOD OF HANDLING HANDOVER IN DUAL CONNECTIVITY

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 3 days.

(21) Appl. No.: 16/006,826

(22) Filed: Jun. 12, 2018

(65) Prior Publication Data

US 2018/0368029 A1   Dec. 20, 2018

Related U.S. Application Data

(60) Provisional application No. 62/519,891, filed on Jun. 15, 2017.

(51) Int. Cl.
| | |
|---|---|
| *H04W 36/00* | (2009.01) |
| *H04W 76/15* | (2018.01) |
| *H04W 24/10* | (2009.01) |
| *H04W 36/08* | (2009.01) |

(52) U.S. Cl.
CPC ....... *H04W 36/0027* (2013.01); *H04W 24/10* (2013.01); *H04W 36/0069* (2018.08); *H04W 76/15* (2018.02); *H04W 36/0016* (2013.01); *H04W 36/0083* (2013.01); *H04W 36/08* (2013.01)

(58) Field of Classification Search
CPC .... H04W 80/04; H04W 8/26; H04L 29/12311
See application file for complete search history.

(56) References Cited

U.S. PATENT DOCUMENTS

| | | |
|---|---|---|
| 2015/0264621 A1 | 9/2015 | Sivanesan |
| 2015/0271713 A1 | 9/2015 | Kim |
| 2016/0135095 A1* | 5/2016 | Wu ................... H04W 36/0027 370/328 |

FOREIGN PATENT DOCUMENTS

| | | |
|---|---|---|
| EP | 3041310 A1 | 7/2016 |
| GB | 2528913 A | 2/2016 |
| WO | 2015/115033 A1 | 8/2015 |
| WO | 2016/006969 A1 | 1/2016 |

OTHER PUBLICATIONS

Search Report dated Aug. 10, 2018 for EP application No. 18178084.2, pp. 1-4.
3GPP TSG-RAN WG2 Meeting #98 R2-1704659, May 2017.
3GPP TSG-RAN WG2 Meeting #98 R2-1705415, May 2017.

* cited by examiner

*Primary Examiner* — Chandrahas B Patel
(74) *Attorney, Agent, or Firm* — Winston Hsu

(57) ABSTRACT

A first master node (MN) receives an interface message from a secondary node (SN), wherein the second interface message comprises at least one of a first measurement configuration and a secondary cell group (SCG) configuration; the first MN transmits a Handover Request message to a second MN, wherein the Handover Request message comprises the at least one of the first measurement configuration and the second SCG configuration; the first MN receives a Handover Request Acknowledge message from the second MN, wherein the Handover Request Acknowledge message comprises a Handover Command message; and the first MN transmits the Handover Command message to the communication device.

11 Claims, 4 Drawing Sheets

METHOD OF HANDLING HANDOVER IN DUAL CONNECTIVITY

CROSS REFERENCE TO RELATED APPLICATIONS

This application claims the benefit of U.S. Provisional Application No. 62/519,891 filed on Jun. 15, 2017, which is incorporated herein by reference.

BACKGROUND OF THE INVENTION

1. Field of the Invention

The present invention relates to a communication device and a method used in a wireless communication system, and more particularly, to a communication device and a method of handling a handover in dual connectivity.

2. Description of the Prior Art

A user equipment (UE) may communicate with a master node and a secondary node in dual connectivity (DC). However, it is unknown how to handle a handover for the UE in the DC. Thus, how to handle the handover for the UE in the DC is an important problem to be solved.

SUMMARY OF THE INVENTION

The present invention therefore provides a method and related communication device for handling a handover in dual connectivity to solve the abovementioned problem.

The method includes: a first BS connecting to a communication device with a first signalling radio bearer (SRB); the first BS transmitting a radio resource control (RRC) message to the communication device via the first SRB, wherein the RRC message comprises a first secondary cell group (SCG) configuration configuring a second BS as a secondary node (SN); the second BS transmitting a first measurement configuration to the communication device via a second SRB; the second BS receiving a first measurement report associated to the first measurement configuration from the communication device via the second SRB; the first BS determining a handover of the communication device from the first BS to a third BS; the first BS transmitting a first interface message to the second BS in response to the determination; the first BS receiving a second interface message in response to the first interface message from the second BS, wherein the second interface message comprises at least one of the first measurement configuration and a second SCG configuration; the first BS transmitting a Handover Request message to the third BS, wherein the Handover Request message comprises the at least one of the first measurement configuration and the second SCG configuration; the first BS receiving a Handover Request Acknowledge message in response to the Handover Request message from the third BS, wherein the Handover Request Acknowledge message comprises a Handover Command message; and the first BS transmitting the Handover Command message to the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
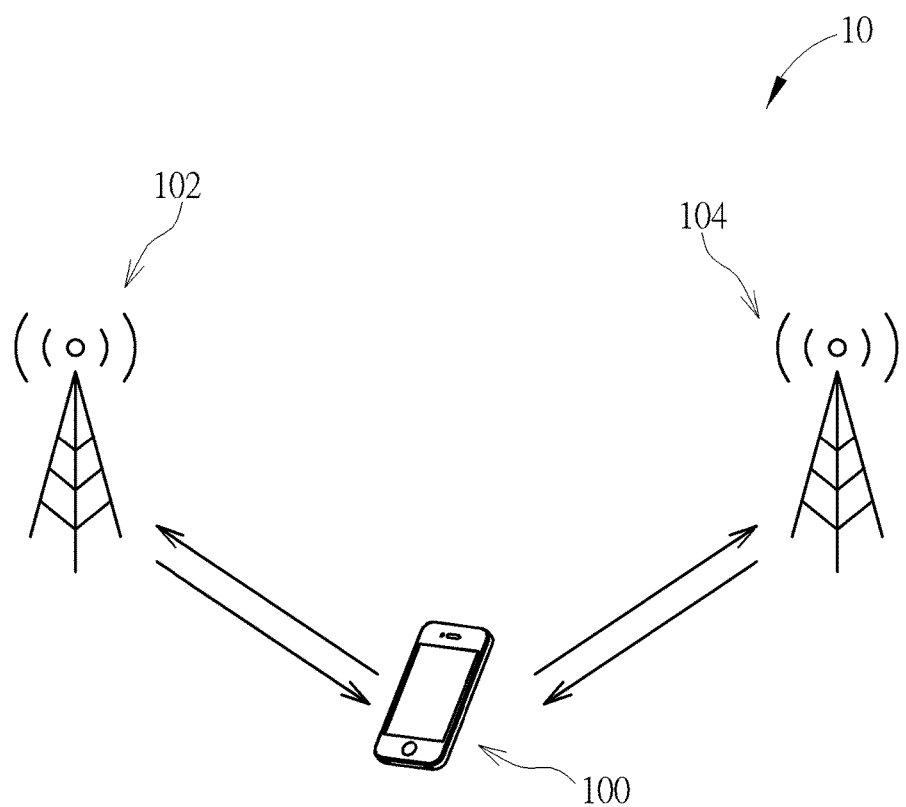
FIG. 1 is a schematic diagram of a wireless communication system according to an example of the present invention.

FIG. 1 is a schematic diagram of a wireless communication system 10 according to an example of the present invention. The wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10.

As shown in FIG. 1, the communication device 100 may be configured to simultaneously connect to the BSs 102 and 104 (i.e., dual connectivity (DC)). That is, the communication device 100 in the DC may perform a transmission/reception via both the BSs 102 and 104. For example, the communication device 100 may receive packets from the BS 102 at a first carrier frequency and the BS 104 at a second carrier frequency, or the communication device 100 may transmit packets to the BS 102 at a first carrier frequency and the BS 104 at a second carrier frequency. In addition, one of the BSs 102 and 104 may be a master node (MN) and the other BS may be a secondary node (SN).

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 is a receiver(s), and for a downlink (DL), the BS(s) 102 and/or 104 is a transmitter(s) and the communication device 100 is a receiver.

Figure 2:
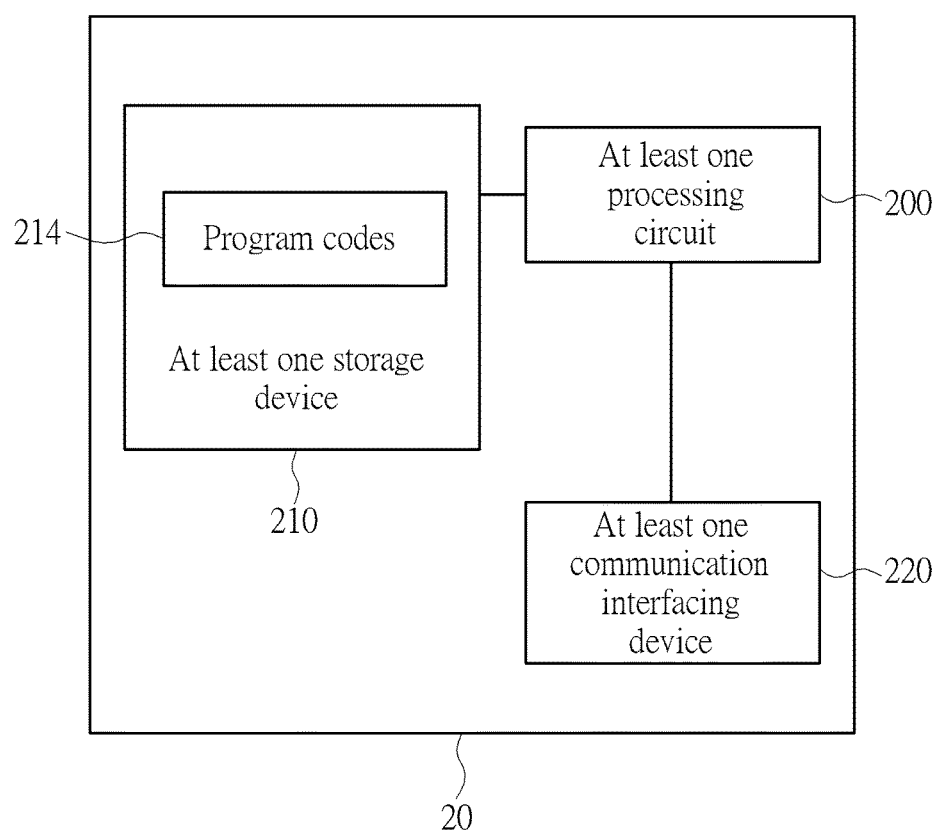
FIG. 2 is a schematic diagram of a communication device according to an example of the present invention.

FIG. 2 is a schematic diagram of a communication device 20 according to an example of the present invention. The communication device 20 may be the communication device 100, the BS(s) 102 and/or 104 shown in FIG. 1, but is not limited herein. The communication device 20 may include at least one processing circuit 200 such as microprocessor or Application Specific Integrated Circuit(s) (ASIC(s)), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

In the following examples, a UE is used for representing the communication device 100 in FIG. 1, to simplify the illustration of the embodiments.

Figure 3:
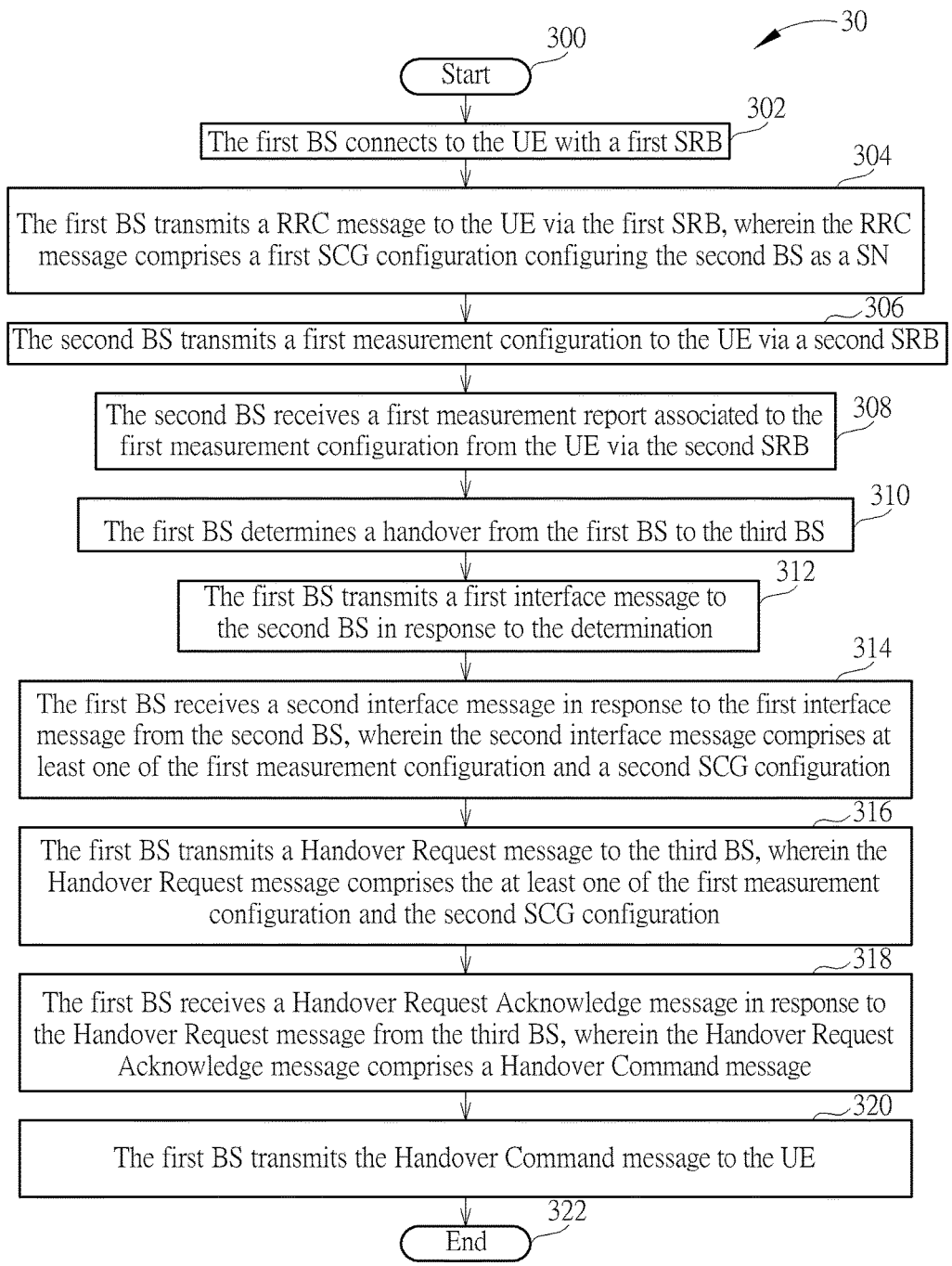
FIG. 3 is a flowchart of a process according to an example of the present invention.

A process 30 in FIG. 3 may be utilized in a first BS (e.g., the BS 102) and a second BS (e.g., the BS 104), and includes the following steps:

Step 300: Start.

Step 302: The first BS connects to the UE with a first signalling radio bearer (SRB);

Step 304: The first BS transmits a radio resource control (RRC) message to the UE via the first SRB, wherein the RRC message comprises a first secondary cell group (SCG) configuration configuring the second BS as a SN.

Step 306: The second BS transmits a first measurement configuration to the UE via a second SRB.

Step 308: The second BS receives a first measurement report associated to the first measurement configuration from the UE via the second SRB.

Step 310: The first BS determines a handover from the first BS to the third BS.

Step 312: The first BS transmits a first interface message to the second BS in response to the determination.

Step 314: The first BS receives a second interface message in response to the first interface message from the second BS, wherein the second interface message comprises at least one of the first measurement configuration and a second SCG configuration.

Step 316: The first BS transmits a Handover Request message to the third BS, wherein the Handover Request message comprises the at least one of the first measurement configuration and the second SCG configuration.

Step 318: The first BS receives a Handover Request Acknowledge message in response to the Handover Request message from the third BS, wherein the Handover Request Acknowledge message comprises a Handover Command message.

Step 320: The first BS transmits the Handover Command message to the UE.

Step 322: End.

According to the process 30, the first BS transmits the at least one of the first measurement and the second SCG configuration, for the third BS to determine whether to keep configuring the second BS as the SN for the UE after the handover to the third BS.

In one example, the third BS receives a Handover Complete message in response to the Handover Command message from the UE.

In one example, the second interface message may or may not include the first measurement configuration. In one example, the second interface message may or may not include the second SCG configuration.

In one example, the first interface message includes an identity (ID) of the UE, for the second BS to identify a UE context of the UE. The second interface message may include the identity of the UE. The identity may be a SN UE X2AP ID or a SN UE XnAP ID.

In one example, the Handover Command message is an RRCConnectionReconfiguration message. In one example, the Handover Complete message is an RRCConnecitonReconfiguration Complete message.

In one example, the Handover Command message releases the second BS, and does not configure a BS as the SN (i.e., a new SN) for the UE. That is, the Handover Command message configures the UE to be not in the DC. The UE releases the connection with the second BS in response to the Handover Command. Thus, the UE only communicates with the third BS, after the handover to the third BS.

In one example, the Handover Command message does not release the second BS, and does not configure a BS as the SN (i.e., a new SN) for the UE. That is, the Handover Command message configures the UE to be in the DC with the third BS and the second BS.

In one example, the Handover Command message includes a third SCG configuration configuring a fourth BS as the SN (i.e., changing the SN from the second BS to the fourth BS, i.e., the handover with a SN change) for the UE. That is, the UE is in the DC with the third BS and the fourth BS, after the handover to the third BS.

In one example, the Handover Command message includes a third SCG configuration keeping (or maintaining) the second BS as the SN (i.e., the handover without the SN change) for the UE. That is, the UE is in the DC with the third BS and the second BS, after the handover to the third BS.

In one example, the second BS determines (or generates) the first SCG configuration. In one example, the second BS transmits the first SCG configuration to the first BS.

In one example, the first SCG configuration configures the UE to communicate with the second BS in the DC. In one example, the first SCG configuration, the second SCG configuration and/or the third SCG configuration includes at least one of a frame structure configuration, a physical cell identity (PCI), carrier information, a temporary identifier (e.g., Cell Radio Network Temporary Identifier (C-RNTI)) assigned to the UE, a physical layer configuration (e.g., for physical channel(s), transmission mode, a reference signal, a channel state information reporting, etc.), a medium access control (MAC) configuration and at least one radio bearer (RB) configuration.

In one example, the at least one RB configuration includes a SRB configuration and/or a data radio bearer (DRB) configuration. Each of the at least one RB configuration includes at least one of a RB identity and a radio link control (RLC) configuration. The SRB configuration may configure the second SRB to the UE. The DRB configuration may configure a SCG part of a DRB (e.g., MCG split bearer), a DRB of a SCG bearer or a DRB of a SCG split bearer. The RB configuration may or may not include a packet data convergence protocol (PDCP) configuration.

In one example, the second SCG configuration is the same with or different from the first SCG configuration. For example, the second SCG configuration has at least one configuration different from that in the first SCG configuration. In one example, the at least one configuration includes the physical layer configuration, the MAC configuration, the frame structure configuration, the PCI and/or the carrier information. The second BS may transmit the at least one configuration to the UE via the second SRB, but the first BS may not know the at least one configuration, e.g., the first BS may receive old value(s) of the at least one configuration, or may never receive the at least one configuration. Similarly, the first BS does not know the first measurement configuration. Thus, the first BS can get the latest SCG configuration (i.e., the second SCG configuration) and the first measurement configuration from the second BS, before initiating the handover by transmitting the Handover Request message.

In one example, the third SCG configuration does not include the SRB configuration such that the UE keeps using the SRB configuration received from/configured by the second BS in the second SCG configuration. The third SCG configuration may not include the DRB configuration such that the UE keeps using the DRB configuration received from/configured by the second BS in the second SCG configuration.

In one example, the third SCG configuration is the same with or different from the second SCG configuration. For example, the third SCG configuration has at least one configuration different from the second SCG configuration. In one example, the at least one configuration include the physical layer configuration, the MAC configuration, the frame structure configuration, the physical cell identity and/or the carrier information.

In one example, the third BS transmits the at least one of the first measurement configuration and the second SCG configuration to the fourth BS (or the second BS), when the third BS determines to configure the fourth BS (or the second BS) as the SN for the UE. The fourth BS (or the second BS) may determine (or generate) the third SCG configuration according to the second SCG configuration. The fourth BS (or the second BS) may determine whether to keep (keep or release) the first measurement configuration for the UE, or may configure a second measurement configuration to the UE. The Handover Command message may indicate the UE to keep or release the first measurement configuration, and may include the second measurement configuration.

In one example, the first interface message explicitly or implicitly requests the at least one of the second SCG configuration and the first measurement configuration. In one example, the first interface message specifically requests the second SCG configuration. In one example, the first interface message not only requests the second SCG configuration but also is for other purpose(s).

In one example, the first interface message is a SN Change Indication message, a SN Release Request message, a SN Modification Request message, a SN Configuration Enquiry message, a Retrieve UE Context Request message, a SN Configuration Retrieve Request message or a Retrieve UE SN Configuration Request message. In one example, the second interface message is a SN Change Confirm message, a SN Change Response message, a SN Modification Request Acknowledge message, a SN Change Request message, a SN Change Required message, a SN Configuration Confirm message, a SN Configuration Information or a Retrieve UE Context Response message, a SN Configuration Retrieve Response message or a Retrieve UE SN Configuration Response message.

In one example, the second BS stops configuring a new configuration to the UE and stops reconfiguring (e.g., changing) a configuration of the UE via the second DRB, when the second BS receives the first interface message from the first BS. Thus, the second SCG configuration is not updated by the second BS during the handover to the third BS. In one example, the second BS configures or reconfigures a configuration during the handover to the third BS, if the configuration is differently configured by the second BS and the third BS as defined by 3rd Generation Partnership Project (3GPP) standard (e.g., a delta configuration is not supported for the configuration).

In one example, the first SRB is a SRB 1 which is a MCG bearer or a MCG split bearer. The second SRB may be a SRB 3 which is a SCG bearer or a SCG split bearer.

In one example, the first BS configures a third measurement configuration to the UE. For example, the first BS transmits the third measurement configuration to the UE via the first SRB. The first BS may receive a second measurement report associated to the third measurement configuration, from the UE via the first SRB. The first BS may or may not include the third measurement configuration in the Handover Request message.

In one example, the third BS may or may not include a fourth measurement configuration in the Handover Command message or in the Handover Request Acknowledge message.

Realization of the process 30 is not limited to the above description. Examples described below may be applied to the process 30.

In one example, the first measurement configuration configures the UE to measure a first carrier, and the second measurement configuration configures the UE to measure a second carrier different from the first carrier. For example, the first measurement configuration includes/indicates a first Absolute Radio Frequency Channel Number (ARFCN), and the second measurement configuration includes/indicates a second ARFCN which may be same as or different from the first ARFCN.

In one example, the above measurement configuration configures a reporting configuration specifying a reporting criterion (e.g., a periodic reporting or an event type). The first measurement configuration and the second measurement configuration may have the same criterion or different reporting criterions. In one example, the measurement configuration above may or may not configure a measurement gap configuration.

In one example, the RRC message (e.g., RRCConnectionReconfiguration) is generated by the first BS or the second BS. The UE transmits a RRC response message to the first BS via the first SRB or to the second BS via the first BS via the first SRB, in response to the RRC message. In one example, the second BS generates the RRC message (i.e., a SN RRC message), and forwards the RRC message to the first BS. The first BS may encapsulate the RRC message in a MN RRC message (e.g., RRCConnectionReconfiguration), and may transmit the MN RRC message to the UE via the first SRB. The UE may transmit a MN RRC response message (e.g., RRCConnectionReconfiguration Complete) to the first BS via the first SRB, in response to the MN RRC message. The MN RRC response message may or may not include the RRC response message. In case that the RRC response is included in the MN RRC response message, the first BS may forward the RRC response to the second BS.

In one example, the second BS transmits a SN RRC message (e.g., RRCReconfiguration) including the first measurement configuration to the UE via the second SRB, while the UE is in the DC with the first BS and the second BS or with the third BS and the second BS. In response to the SN RRC message, the UE may transmit a SN RRC response message (e.g., RRCReconfiguration Complete) to the second BS via the second SRB.

In one example, the first BS transmits a MN RRC message (e.g., RRCConnectionReconfiguration) including the third measurement configuration to the UE via the first SRB. The UE transmits a MN RRC response message (e.g., RRCConnectionReconfiguration Complete) to the first BS via the first SRB in response to the MN RRC message. In one example, the third measurement configuration is received by the first BS and the UE from a fifth BS. The first BS may implicitly configure the third measurement configuration to the UE by making the UE keep using the third measurement configuration in a Handover Command generated by the first BS.

In one example, the first and the third BSs are evolved Node-Bs (eNBs), and the second and the fourth BSs are next generation NBs (gNBs). In one example, the first and the third BSs are gNBs, the second and the fourth BSs are eNBs. In one example, the first, second, third and fourth BSs are gNBs. In the present invention, the message names are simply examples, and should not be treated as limitations for realizing the present invention.

In one example, the UE sets up the first SRB in response to a RRC connection establishment procedure. In one example, the UE performs the RRC connection establishment procedure by transmitting a RRCConnectionRequest message to a BS (e.g., the first BS or the fourth BS). The BS may transmit a RRCConnectionSetup message configuring the first SRB to the UE in response to the RRCConnectionRequest message.

In one example, the second BS configures the second SRB to the UE via the first BS. In one example, the second BS generates a SN RRC message (e.g., RRCReconfiguration) including a SRB configuration of the second SRB and transmits the SN RRC message to the first BS. Then, the first BS encapsulates the SN RRC message in a MN RRC message (e.g., RRCConnectionReconfiguration message), and transmits the MN RRC message to the UE, e.g., via the first SRB. The first BS may receive a MN RRC response message responding to the MN RRC message from the UE via the first SRB.

In one example, the third SCG configuration is included in a SN RRC message generated by the second/fourth BS. The second/fourth BS transmits the SN RRC message to the third BS in a SN Addition Request Acknowledge message. The third BS includes the SN RRC message in the Handover Command message.

The MN RRC message (s) and the SN RRC message (s) described above may be the same message or different messages. "via" described above may be replaced by "on".

Figure 4:
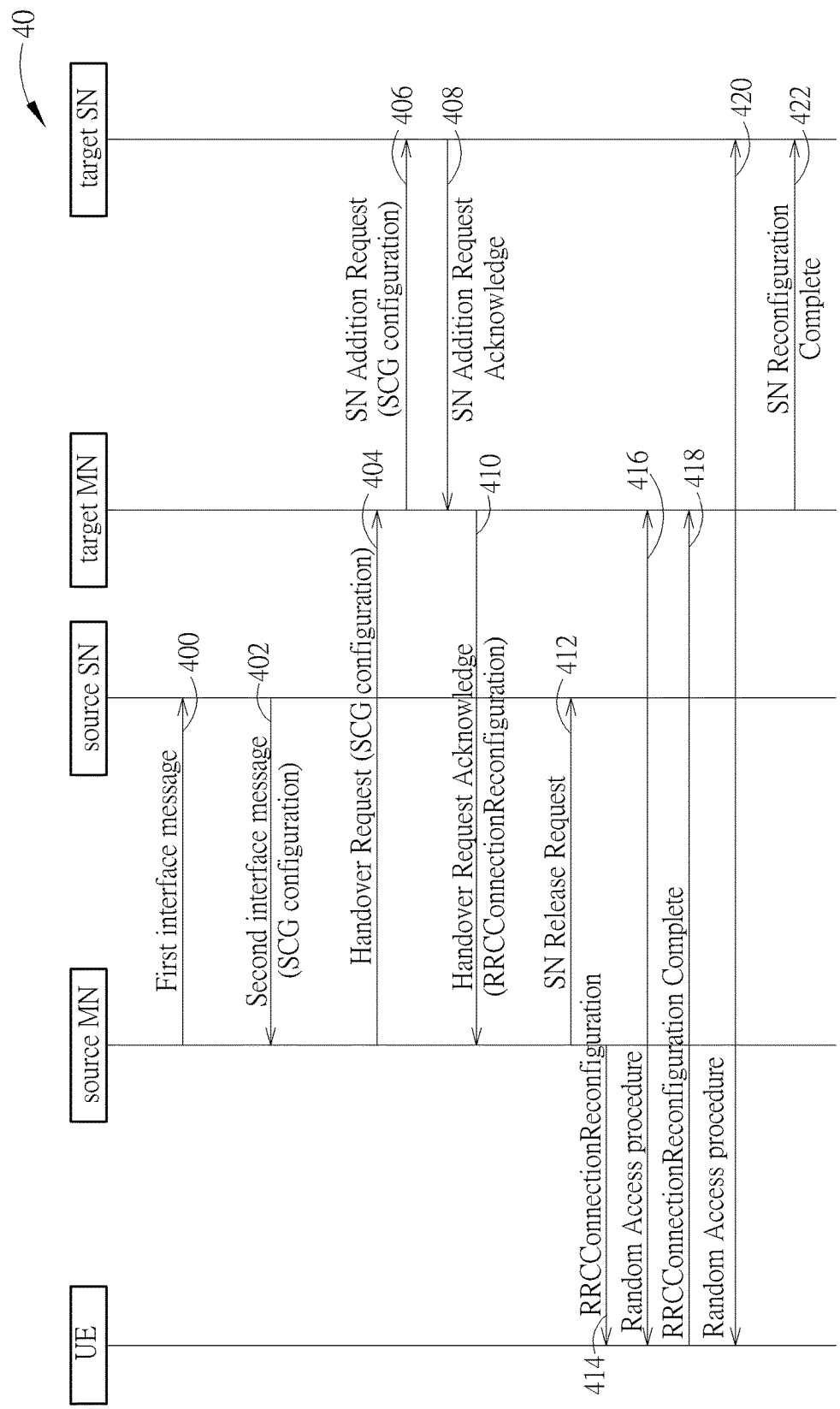
FIG. 4 is a procedure of a handover with a SN change in dual connectivity according to an example of the present invention.

FIG. 4 is a procedure 40 of a handover with a SN change in DC according to an example of the present invention. The source MN determines a handover from the source MN to the target MN for the UE. The source MN transmits the first interface message in the process 30 to the source SN in response to the determination (Step 400), and accordingly, receives the second interface message in the process 30 from the source SN (Step 402). The second interface message includes the latest SCG configuration configured by the source SN to the UE (e.g., the second SCG configuration in the process 30).

The source MN initiates the handover by transmitting a Handover Request message including the latest SCG configuration to the target MN (Step 404). The target MN transmits a SN Addition Request message including the latest SCG configuration to the target SN (Step 406), and accordingly, receives a SN Addition Request Acknowledge message from the target SN (Step 408). The target MN transmits a Handover Request Acknowledge message including a RRCConnectionReconfiguration message (i.e., Handover Command) to the source MN (Step 410). The source MN transmits a SN Release Request message to the source SN (Step 412). The source MN transmits the RRCConnectionReconfiguration message to the UE (Step 414). The UE may perform a Random Access (RA) procedure with the target MN (Step 416). The UE transmits a RRCConnectionReconfiguration Complete message (i.e., Handover Complete) in response to the Handover Command message to the target MN (Step 418). The UE perform a RA procedure with the target SN (Step 420). The target MN transmits a SN Reconfiguration Complete message to the target SN (Step 422).

According to the procedure 40, the target MN uses the target SN as a SN for the UE (i.e., the UE is in the DC with the target MN and the target SN), after the handover to the target MN.

Those skilled in the art should readily make combinations, modifications and/or alterations on the abovementioned steps, description and examples. Some steps described above may not be necessary for realizing the present invention. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the processes above may be compiled into the program codes 214. For the process (es) involving the first BS and second BS, the steps performed by the first BS may be compiled into the program codes 214 of the first BS and the steps performed by the second BS may be compiled into the program codes 214 of the second BS.

To sum up, the present invention provides a method and related communication device transmitting the measurement configuration or the latest SCG configuration configured by a source SN to a UE, to a target MN in a handover preparation. Thus, the problem of handling the handover in the DC is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network comprising a first base station (BS), a second BS and a third BS for handling a handover for a communication device in a dual connectivity, comprising:
   at least one storage device; and
   at least one processing circuit, coupled to the at least one storage device, wherein the at least one storage device stores, and the at least one processing circuit is configured to execute instructions of:
   the first BS connecting to the communication device with a first signalling radio bearer (SRB);
   the first BS transmitting a radio resource control (RRC) message to the communication device via the first SRB, wherein the RRC message comprises a first secondary cell group (SCG) configuration configuring the second BS as a secondary node (SN);
   the second BS transmitting a first measurement configuration to the communication device via a second SRB;
   the second BS receiving a first measurement report associated to the first measurement configuration from the communication device via the second SRB;
   the first BS determining the handover from the first BS to the third BS;
   the first BS transmitting a first interface message to the second BS in response to the determination;
   the first BS receiving a second interface message in response to the first interface message from the second BS, wherein the second interface message comprises at least one of the first measurement configuration and a second SCG configuration;
   the first BS transmitting a Handover Request message to the third BS, wherein the Handover Request message comprises the at least one of the first measurement configuration and the second SCG configuration;

the first BS receiving a Handover Request Acknowledge message in response to the Handover Request message from the third BS, wherein the Handover Request Acknowledge message comprises a Handover Command message; and the first BS transmitting the Handover Command message to the communication device.

2. The network of claim 1, wherein the instructions further comprise:

the third BS receiving a Handover Complete message in response to the Handover Command message from the communication device.

3. The network of claim 1, wherein the Handover Command message releases the second BS, and does not configure a BS as the SN for the communication device.

4. The network of claim 1, wherein the Handover Command message comprises a third SCG configuration configuring the second BS or a fourth BS as the SN for the communication device.

5. The network of claim 4, wherein the instructions further comprise:

the third BS transmitting the at least one of the first measurement configuration and the second SCG configuration to the second BS or the fourth BS, when determining to configure the second BS or the fourth BS as the SN for the communication device.

6. The network of claim 5, wherein the instructions further comprise:

the second BS determining whether to keep the first measurement configuration for the communication device; or the second BS configuring a second measurement configuration to the communication device.

7. The network of claim 6, wherein the second measurement configuration is comprised in the Handover Command message.

8. The network of claim 1, wherein the instructions further comprise:

the second BS transmitting the first SCG configuration to the first BS.

9. The network of claim 1, wherein the first interface message requests at least the second SCG configuration.

10. The network of claim 1, wherein the instructions further comprise:

the second BS stopping updating the second SCG configuration via the second DRB, when receiving the first interface message from the first BS.

11. The network of claim 1, wherein the instructions further comprise:

the first BS transmitting a third measurement configuration to the communication device via the first SRB; and the first BS receiving a second measurement report associated to the third measurement configuration from the communication device via the first SRB.

* * * * *